United States Patent
Moffatt et al.

(10) Patent No.: US 7,590,350 B2
(45) Date of Patent: Sep. 15, 2009

(54) SYSTEM AND METHOD FOR AUTOMATED ENGINEERING OF OPTICAL NETWORKS

(75) Inventors: Gregory Moffatt, Stittsville (CA); Joanne Wakefield, Ottawa (CA); Thomas Coleman, Nepean (CA); Mark Riley, Ottawa (CA); Charles Hubbard, Nepean (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 881 days.

(21) Appl. No.: 10/653,632

(22) Filed: Sep. 2, 2003

(65) Prior Publication Data

US 2005/0041600 A1 Feb. 24, 2005

Related U.S. Application Data

(60) Provisional application No. 60/493,683, filed on Aug. 8, 2003.

(51) Int. Cl.
*H04B 10/08* (2006.01)
*H04J 14/02* (2006.01)

(52) U.S. Cl. .......................... 398/25; 398/34; 398/43; 398/79

(58) Field of Classification Search ............. 398/26–29, 398/79, 25, 9, 33, 34, 43, 83, 66
See application file for complete search history.

(56) References Cited

U.S. PATENT DOCUMENTS

| | | | | |
|---|---|---|---|---|
| 7,046,429 | B2 * | 5/2006 | Halevi et al. | 359/337.1 |
| 7,242,863 | B2 * | 7/2007 | DeGrange, Jr. | 398/30 |
| 2001/0019436 | A1 * | 9/2001 | Nakajima et al. | 359/110 |
| 2002/0126351 | A1 * | 9/2002 | Chung et al. | 359/124 |
| 2003/0016411 | A1 * | 1/2003 | Zhou et al. | 359/110 |
| 2003/0058494 | A1 * | 3/2003 | Roberts et al. | 359/115 |
| 2003/0099014 | A1 * | 5/2003 | Egner et al. | 359/124 |

* cited by examiner

*Primary Examiner*—M. R. Sedighian
(74) *Attorney, Agent, or Firm*—Guerin & Rodriguez, LLP; William G. Guerin

(57) ABSTRACT

A computerized method for modifying an optical wavelength division multiplexing (WDM) network is described. The method includes providing an initial configuration of the optical WDM network. At least one parameter that represents a characteristic of a span in the optical WDM network as defined by the initial configuration is evaluated. The initial configuration of the optical WDM network is modified in response to the evaluation. The method can also include determining if a predetermined set of engineering rules are satisfied.

13 Claims, 7 Drawing Sheets

SYSTEM AND METHOD FOR AUTOMATED ENGINEERING OF OPTICAL NETWORKS

CROSS-REFERENCE TO RELATED APPLICATION

This application claims the benefit of the filing date of U.S. provisional patent application Ser. No. 60/493,683, filed Aug. 8, 2003, titled "System and Method for Automated Engineering of Optical Networks," the entirety of which provisional application is incorporated by reference herein.

FIELD OF THE INVENTION

The invention relates generally to the computer modeling of optical networks. More particularly, the invention relates to a system and method that automatically modifies an optical wavelength division multiplexing (WDM) network to improve performance.

BACKGROUND

The task of engineering a WDM network consists of identifying the appropriate type of equipment, the appropriate location of the equipment, and specifying the required settings of the equipment so that optical signals transmitted through the network have satisfactory optical characteristics. Computer modeling software can be used to aid in engineering new WDM networks and modifying existing WDM networks. As shown in FIG. 1, central to the engineering process is a software modeling environment 10, including a computer system 12 for running the computer modeling software. A network designer executes the software to generate a computer model 16 of an optical network 14. The optical network 14 typically includes fiber optic links 18, or optical spans, through which multiple channels of bi-directional optical signals are multiplexed on a pair of optical fibers. Each signal is defined on a carrier wavelength. The links 18 connect sites 22 in the optical network 14. A site, as used herein, generally refers to a building or structure in which network equipment and components are maintained and operated. Network equipment and components include, for example, optical amplifiers, regenerators, band equalizers, optical multiplexers, and the like.

The software modeling environment 10 allows a network designer to add, remove and/or relocate network components, and simplifies the process of changing equipment settings and topologies. Further, the software modeling environment 10 can include an analysis module for evaluating the operational parameters describing the modeled network 16 and determining their effect on the performance of the optical network 14.

When designing an optical network, a network engineer performs several general tasks. First, the engineer produces a network plan that includes a description of the functionality to be provided by the network and identifies the constraints for the network. Next, the engineer generates an initial configuration for the network. To evaluate the performance of the initial configuration, the engineer uses the analysis module to evaluate various parameters that represent the characteristics of the spans in the network. Such parameters include optical power, optical signal-to-noise ratio (OSNR), chromatic dispersion, polarization mode dispersion (PMD), jitter and crosstalk. If any of the parameters are unsatisfactory, the engineer modifies the network by changing the initial configuration, for example, by adding, removing and/or repositioning network components. After "manually" implementing the configuration modifications, the engineer again analyzes the performance of the optical network. This iterative process of manual modifications and subsequent analysis continues until an acceptable network configuration is achieved, or until it is determined that no satisfactory network configuration is possible and the design process is terminated.

The iterative process of manual modifications and analysis is complicated, time consuming and requires highly trained engineers. Consequently, the process is expensive. Moreover, because the process depends on the individual expertise and bias of the network engineers, the network configurations resulting from similar analyses are often inconsistent. The process is complex even for small networks because modifying a single network component can cause numerous changes to optical signal parameters on the connected links or on other links in the network. For example, optical amplifiers are used to extend the range of an optical signal by increasing the signal power, however, optical amplifiers increase the amplified spontaneous emission (ASE) noise of the signal. The ASE noise can be addressed by using equalization techniques, however, additional noise and optical power problems can arise.

What is needed are a system and method for designing WDM networks that overcome the cost, complexity, and time disadvantages of the current techniques.

SUMMARY OF THE INVENTION

In one aspect, the invention features a computerized method for modifying an optical WDM network. The method includes providing an initial configuration of the optical WDM network and evaluating at least one parameter that represents a characteristic of a span in the optical WDM network as defined by the initial configuration. The method also includes modifying the initial configuration of the optical WDM network in response to the evaluation of the one or more parameters. In one embodiment, the method also includes determining if a predetermined set of engineering rules are satisfied. In other embodiments, the evaluation of the at least one parameter includes evaluating a value of chromatic dispersion, polarization mode dispersion, optical signal to noise ratio or crosstalk for the span. In another embodiment, the evaluation of the at least one parameter includes evaluating an optical power at a receiver in the span. In still other embodiments, the modification of the initial configuration includes adjusting a placement in the span of an optical regenerator, or an optical amplifier, or inserting an optical regenerator or an optical amplifier in the span. In yet another embodiment, the modification of the initial configuration includes adjusting at least one setting of equipment in the optical WDM network.

In another aspect, the invention features a computer system for modifying the configuration of an optical WDM network. The computer system includes a WDM network software modeling environment, a network analysis software module and an automated network engineering software module. The WDM network software modeling environment models a WDM network and the network analysis software module evaluates at least one parameter of the modeled WDM network. The automated network engineering software module automatically modifies the WDM network in response to the at least one parameter.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

Figure 1:
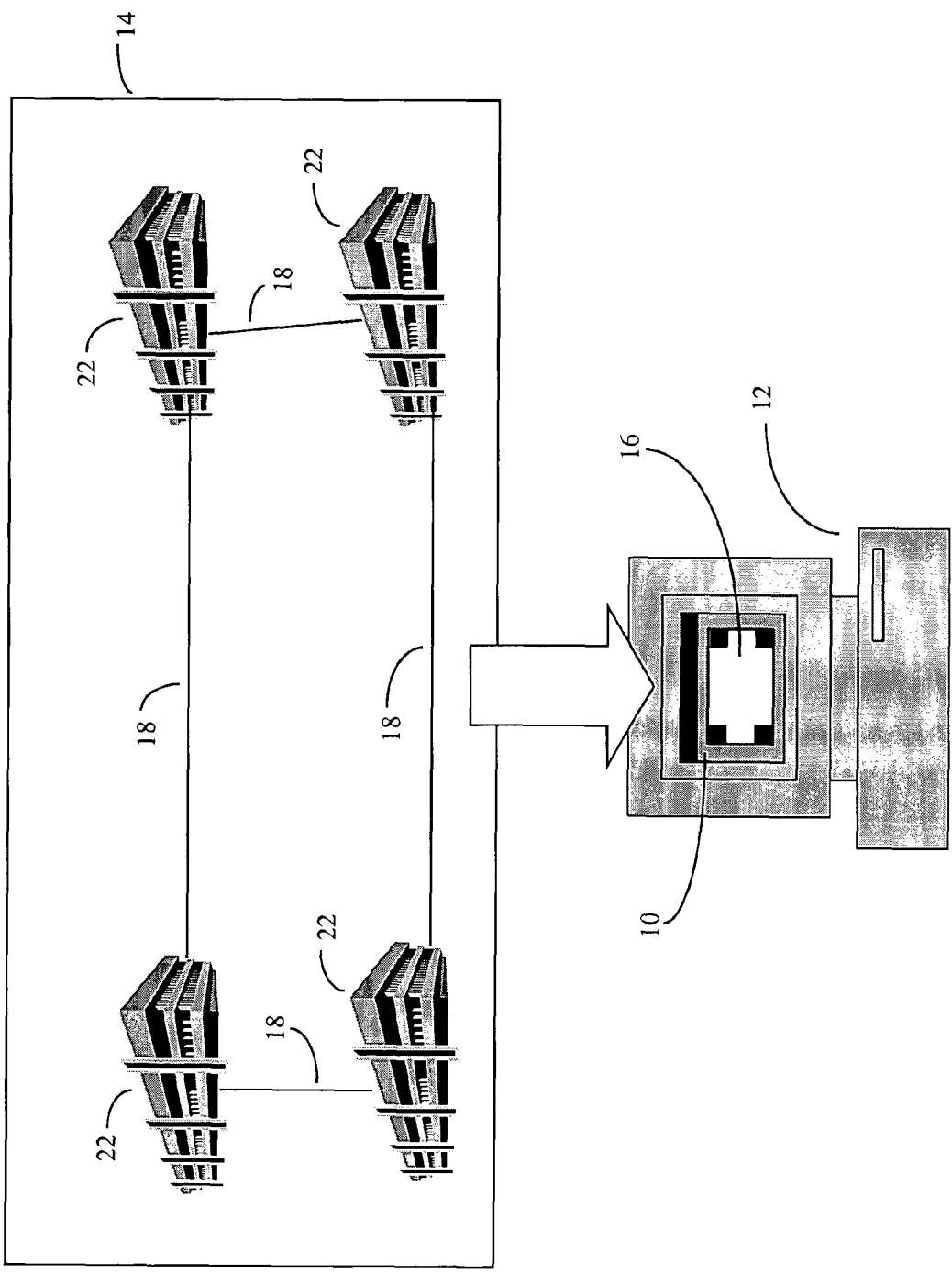
FIG. 1 is graphical representation of a software modeling environment that is used to create a computer model of an optical wavelength division multiplexing network.
Figure 2:
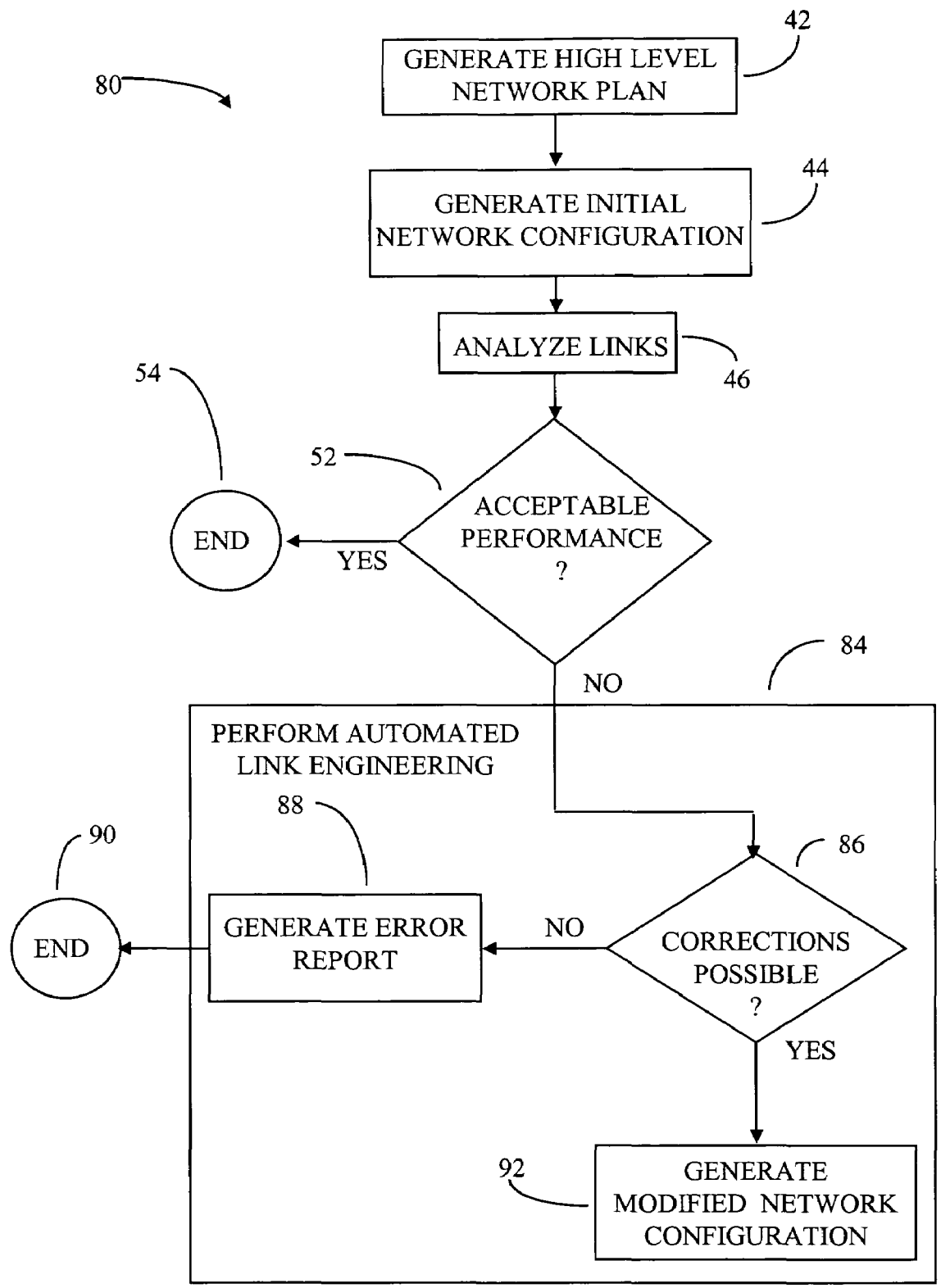
FIG. 2 is a flowchart of an embodiment of a process to configure a wavelength division multiplexing network that includes an automated link engineering process according to the principles of the invention.

FIG. 2 shows an embodiment of a process 80 that automatically modifies a wavelength division multiplexing (WDM) network design. In one embodiment, the process is performed by a software module that is integrated into a software engineering environment. The process 80 includes generating (step 42) a high level network plan. Typically, the high level network plan is generated by identifying the required performance parameters of the network such as the data rates, channel densities and the number of access nodes. An initial configuration for a network is then generated (step 44) by selecting various network equipment and components, and determining where to locate them in the network. This step generally relies on the experience of the individual network engineer. Thus different engineers do not usually select the same initial configuration for the network. In some instances, the initial configuration can be a previously derived network configuration.

The initial configuration of the network is analyzed (step 46) by evaluating a set of network parameters and comparing these values with a set of link engineering rules. The link engineering rules specify acceptable parameter ranges and configuration requirements. A network configuration is acceptable if the configuration does not violate any of the link engineering rules. If the performance of the network is determined (step 52) to be acceptable, the process terminates (step 54) without modifying the initial configuration. However, if the performance is determined (step 52) not to be acceptable, an automated link engineering (ALE) process is executed (step 84).

The ALE process evaluates the initial network configuration to determine (step 86) whether the configuration can be modified to comply with the link engineering rules. If the configuration cannot be made to satisfy the link engineering rules, an error report is generated (step 88) and the process 80 is terminated (step 90). The error report includes a list of the link engineering rules for which acceptable performance could not be achieved. In addition when appropriate, the error report indicates the equipment yielding the unacceptable performance. Depending on the information provided in the error report, the network engineer may reassess the high level plan and generate a new initial network configuration (return to step 44). If changes can be made to the configuration to satisfy the link engineering rules, a modified network configuration is generated (step 92). In a modified configuration, the position and settings of some of the network components and equipment in the initial configuration are changed. In addition, modified configurations can include additional network components and equipment not present in the prior configuration. Moreover, some of the network components and equipment present in the prior configuration may be absent from the modified configuration.

The ALE process determines the behavior of the optical layer based on various parameters, including the optical characteristics and location of the network components and equipment in the network. For example, the parameters can include the location of all network sites, including glass-through sites (i.e., sites at which the signals are not processed), characteristics of the fiber spans between network sites, information identifying the origination and termination points of wavelength bands and channels, line-side interface bit rates, previously designed network equipment used as part of the initial network configuration, and user preference parameters. The modified network configuration specifies the location of amplifiers, regenerators, and associated equipment, and identifies equipment settings, including changes to the settings of pre-existing network equipment. Because the ALE process is deterministic, identical initial configurations always yield the same modified network configuration, if one can be generated, that satisfies the link engineering rules. In one embodiment, generation of the modified network configuration does not change the location or settings of previously defined equipment, but only includes the addition of new equipment. In another embodiment, the user generates a "profile" that defines specific preferences and parameters for various equipment and equipment configurations. In this embodiment the ALE process is constrained by the profile when generating the modified network configuration.

Figure 3:
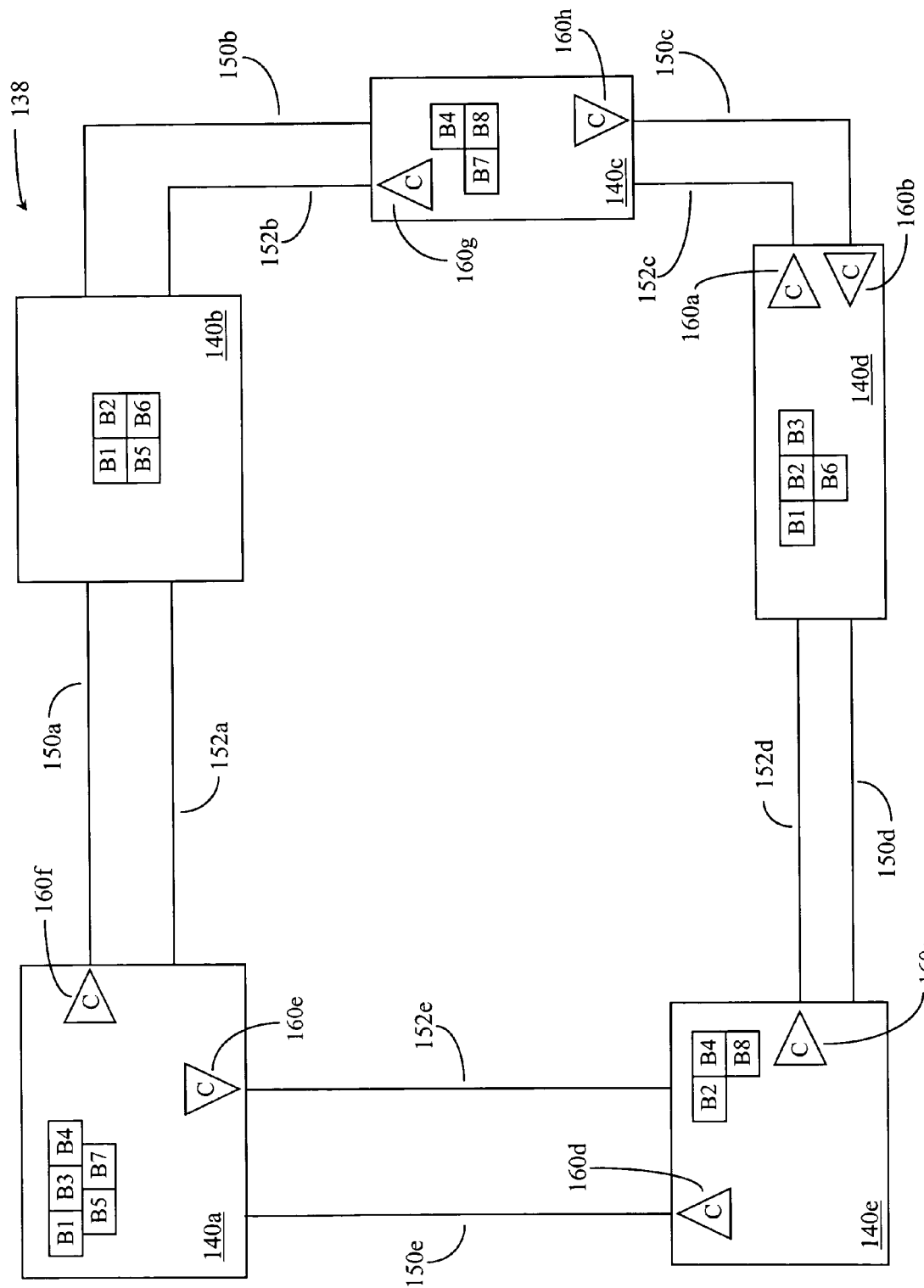
FIG. 3 is a block diagram depicting an example of a wavelength division multiplexing network.

FIG. 3 illustrates a WDM network 138 having a ring topology that is frequently used in a metropolitan environment. The illustration resembles a graphical display provided in the software modeling environment to enable an engineer to view the network configuration. The network 138 includes sites 140a, 140b, 140c, 140d and 140e (generally 140) that are connected by five spans of optical fiber pairs 150a to 150e (generally 150) and 152a to 152e (generally 152) for bi-directional communications. The outer optical fiber loop 150 carries optical signals that propagate in a clockwise direction and the inner loop 152 carries optical signals that propagate in a counter-clockwise direction.

Each fiber supports a maximum of 32 signal channels. The 32 channels are divided into eight bands of four channels each. Each site 140 contains equipment that allows optical signals to be independently added or dropped from the network. The identifiers B1 through B8 refer to equipment for processing a respective signal band. Bands B1 though B4 are conventional bands (C-bands) and include wavelengths between 1535 nm and 1565 nm. Bands B5 through B8 are long bands (L-bands) and include wavelengths between 1570 nm and 1620 nm.

For example, site 140e contains equipment for processing the bands B2, B4, and B8. The existence of processing equipment at the sites 140 determines the access points for various bands in the network 138. For example, optical signals generated at a location not shown in FIG. 3 can be added to the network 138 at site 140a and travel counter-clockwise to the site 140d. At site 140d, such optical signals can be extracted from the network 138 and routed to a destination site or node. Thus, the optical path traversed by such optical signals includes the sites 140*a*, 140*e*, and 140*d*; the links 152*e* and 152*d*; and optical equipment and links external to the network. In traversing the network 138, the optical signals can be carried in either band B1 or band B3 as processing equipment is available for both of these bands at the sites 140*a* and 140*d*.

Some of the network sites 140 include C-band amplifiers 160*a* to 160*h* (generally 160). The direction (i.e., pointing of the triangle) of an amplifier 160 indicates whether it operates on a signal received from an optical fiber 150, 152 or a signal to be transmitted through an optical fiber 150, 152. The location of an amplifier 160 indicates whether the amplification occurs before or after band processing. For example, one amplifier 160*a* in site 140*d* amplifies optical signals after band specific processing for transmission through the optical fiber 152*c*. The amplifier 160*b* in site 140*d* amplifies optical signals received from optical fiber 150*c* before band specific processing occurs. As discussed below, the sites 140 include additional processing equipment such as regenerators, equalizers, and other optical circuitry.

Figure 4:
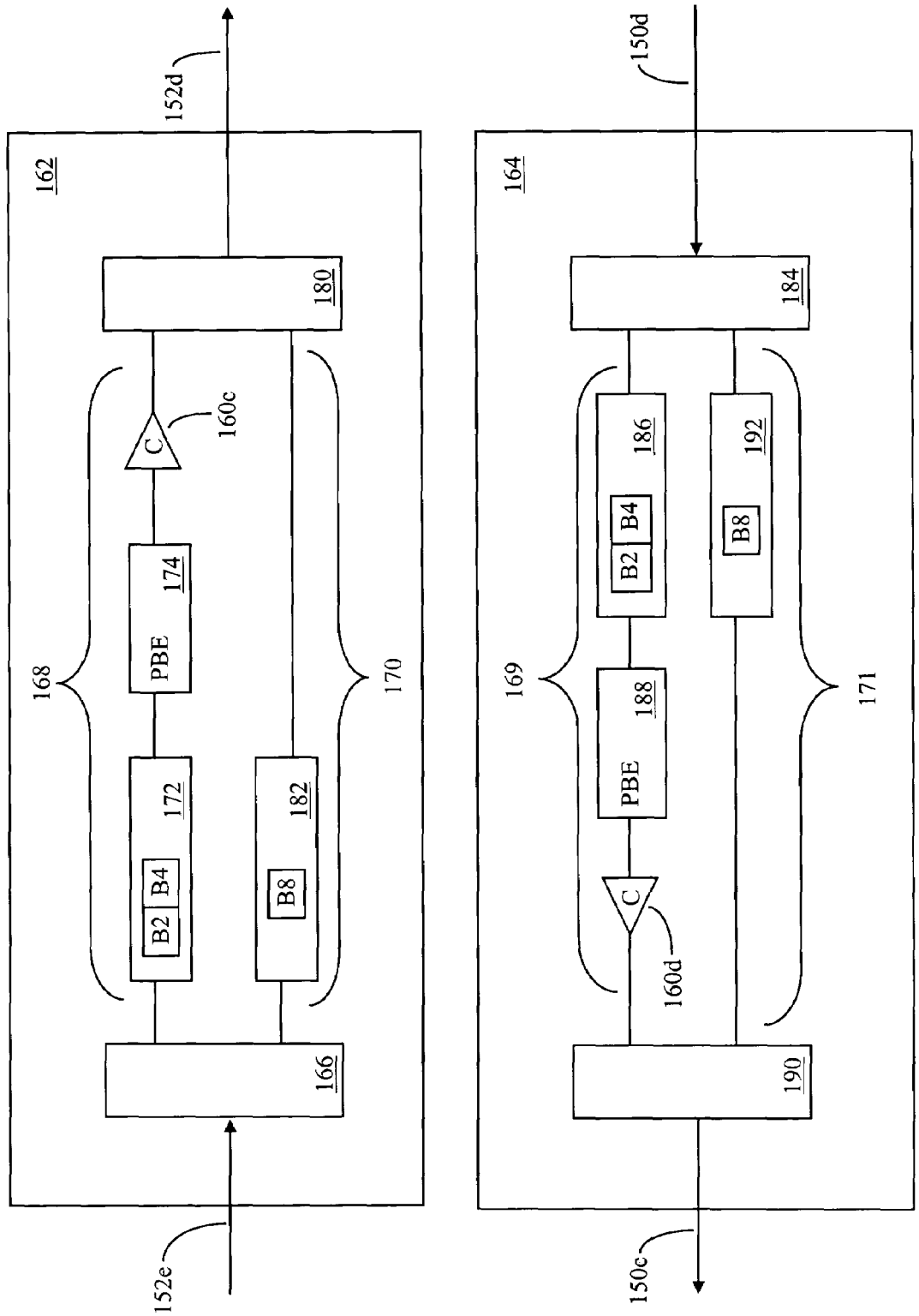
FIG. 4 is a block diagram depicting network equipment present at a site in the wavelength division multiplexing network of FIG. 3.

FIG. 4 shows an illustrative example of the equipment present at the site 140*e*. The illustration resembles a graphical display generated by a software modeling environment to represent to a WDM network. The site 140*e* includes equipment 162 that processes optical signals propagating in a counter-clockwise direction. The equipment 162 includes a splitter 166 and a coupler 180, that are coupled to the optical fibers 152*e* and 152*d*, respectively. The splitter 166 and the coupler 180 are internally coupled through one optical path including an optical circuit 172, a per band equalizer (PBE) 174 and the C-band amplifier 160*c*, and through a second optical path including an optical circuit 182. The site 140*e* also includes equipment 164 that processes optical signals propagating in a clockwise direction. The equipment 164 includes a splitter 184 and a coupler 190, that are coupled to the optical fibers 150*d* and 150*e*, respectively. The splitter 184 and the coupler 190 are internally coupled through two optical paths 169 and 171. One optical path 169 includes an optical circuit 186, a PBE 188 and the C-band amplifier 160*d*. The other optical path 171 includes an optical circuit 192.

In operation, the equipment 162 receives optical signals from the fiber 152*e*. The optical signals are provided to the splitter 166 that directs C-band signals to optical circuit 172 and L-band signals to optical circuit 182. The optical circuit 172 processes C-bands B2 and B4, for example, by adding or removing signals, bridging signals, regenerating signals and the like. Subsequently, the optical circuit 172 transmits the C-band signals to the PBE 174 which equalizes the power levels of the bands B1 through B4. The C-band amplifier 160*c* amplifies the equalized signals and provides the amplified signals to the coupler 180. Providing analogous functionality to the optical circuit 172, the optical circuit 182 processes L-band B8 signals and provides L-band signals to the coupler 180. The coupler 180 multiplexes the C-band and L-band signals onto the fiber 152*d*.

Equipment 164 receives optical signals from the fiber 150*d*. The optical signals are provided to the splitter 184 that directs the C-band signals to optical circuit 186 and the L-band signals to optical circuit 192. The optical circuitry 186 processes the C-bands B2 and B4 and transmits the C-band signals to the PBE 188. The PBE 188 provides equalized C-band signals to the C-band amplifier 160*d*. Amplified C-band signals are then transmitted to the coupler 190. The optical circuit 192 processes L-band B8 signals and provides the L-band signals to the coupler 190. The coupler 190 multiplexes the C-band and L-band signals onto the fiber 150*e*.

Figure 5:
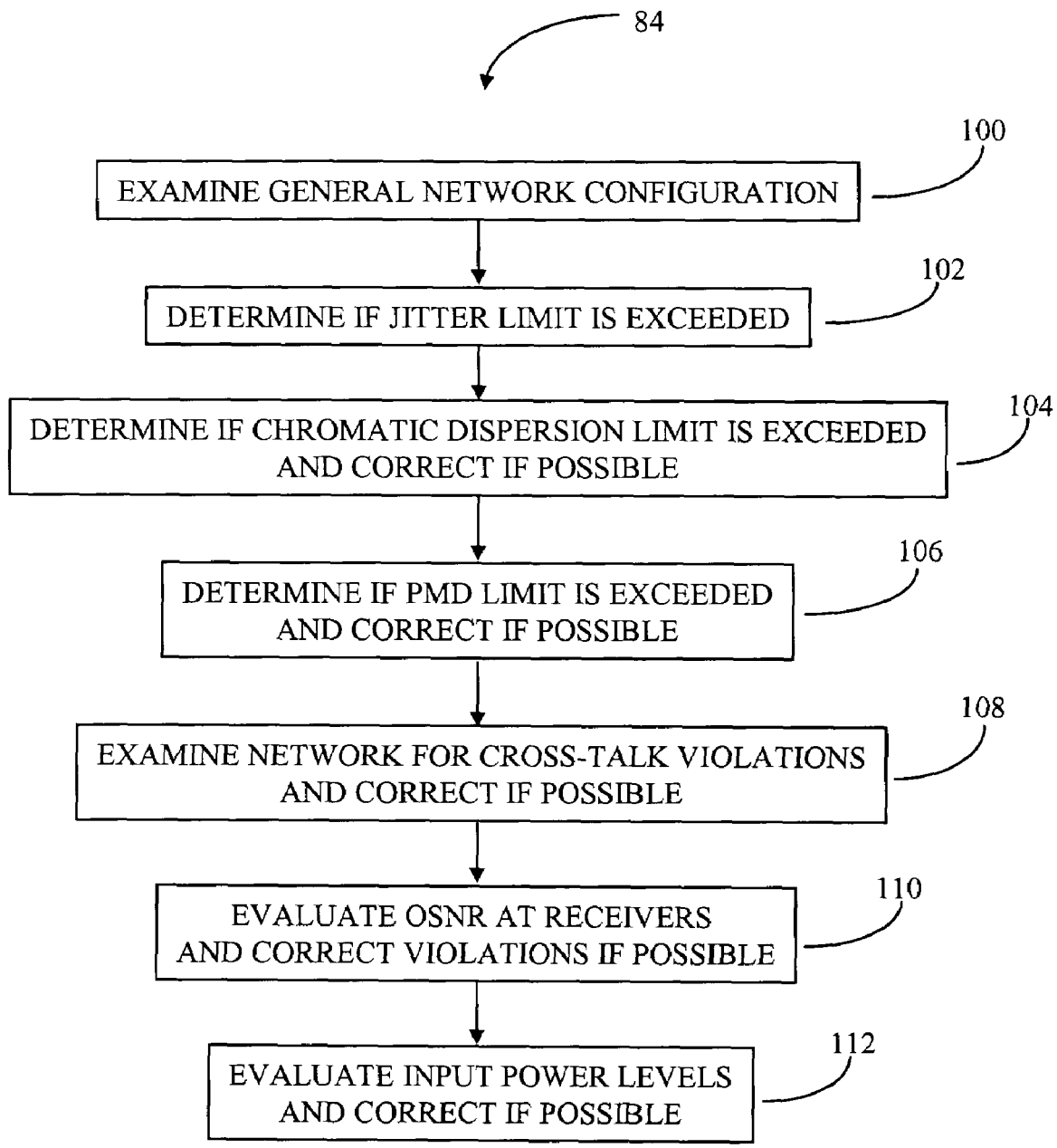
FIG. 5 is a flowchart illustrating an embodiment of the automated link engineering process of FIG. 2.

FIG. 5 shows a flowchart representation of an embodiment of the ALE process (see step 84 of FIG. 2) of the invention. Performing the ALE process 84 includes evaluating parameters representing characteristics of spans in the optical network and applying the parameters to predetermined engineering rules. The process 84 operates on an initial configuration for a network. During the execution of the ALE process 84, the network is repeatedly analyzed to confirm compliance with the engineering rules. If execution of the ALE process is unable to generate a network configuration with satisfactory performance, the execution terminates after reporting information describing the problem.

Referring to FIG. 3 and FIG. 5, the ALE process includes examining (step 100) an initial network configuration to determine, for example, whether the initial network 138 has the proper size and topology. Next, the spans 150, 152 are analyzed to determine (step 102) whether the jitter in the optical signals exceeds a predetermined value. Each regenerator can introduce jitter to the optical signals due to time displacements between regenerated optical pulses and original optical pulses. Consequently, the maximum number of regenerators permitted in a signal path is limited. As part of the jitter analysis, the numbers of regenerators in the signal paths are compared against a predetermined maximum.

Subsequently, the spans 150, 152 are analyzed to determine (step 104) if the temporal dispersion of the optical signals is acceptable. Dispersion arises, for example, from chromatic variations (e.g., refractive index) in the optical fibers 150, 152, and results in the broadening of optical pulses as they propagate through an optical fiber. The broadening of the optical pulses can limit, for example, the maximum data rates. If the chromatic dispersion is determined to be unacceptable, regenerators are added at the appropriate sites 140 to replace the degraded optical pulses with "clean" optical pulses.

The polarization mode dispersion (PMD) introduced by the spans 150, 152 is evaluated and compared with predetermined acceptable values to determine (step 106) whether the effect of PMD on the network 138 is acceptable performance. PMD results in the broadening of an optical pulse due to the time delay between orthogonal polarization components of an optical pulse. Physical characteristics of the optical fiber, such as birefringence, cause PMD. As with chromatic dispersion, the pulse broadening introduced by PMD degrades the optical pulses. If the PMD exceeds a specified value, regenerators are added to the appropriate sites 140 to recreate clean optical pulses.

The network 138 is examined (step 108) to quantify crosstalk between optical signals. Crosstalk, as used herein, refers to the coupling of optical energy between optical signals. Thus, the presence of crosstalk degrades the quality of the optical signals. If crosstalk exceeds an acceptable predetermined level, the operational parameters (i.e., settings) of one or more optical amplifiers are adjusted to achieve acceptable network performance.

The optical signal-to-noise ratio (OSNR) at the network receivers is evaluated (step 110). Each amplifier 160 that is placed in the network 138 amplifies the optical signal and associated noise and also introduces additional noise, thus decreasing the OSNR of the respective signals. Although only C-band amplifiers are present in the illustrated network 138, it should be recognized that L-band amplifiers can also degrade the OSNR. Attempts to correct unacceptable OSNR values are made by relocating amplifiers 160 or regenerators in the affected paths.

Lastly, the optical power at each receiver is compared (step 112) to a predetermined power level to determine whether the optical power is acceptable. An acceptable power level is one, for example, that exceeds a threshold power. The threshold power is defined as a minimum optical power at the receiver plus a penalty (i.e., margin) based on parameters of the light at the receiver. For example, the light at the receiver may have jitter that is within an acceptable range, but the penalty that is included in the threshold power is based on the amount of jitter which may cause the optical power incident on the receiver to be insufficient. Other optical parameters, such as PMD, crosstalk and OSNR, can also contribute to the penalty which also varies according to the bitrate of the optical signal. For example, 10 Gbps optical signals are significantly more affected by penalty than 1.25 Gbps and 2.5 Gbps optical signals. Pulse broadening introduced by chromatic dispersion and PMD can cause the power level of the optical signals in the network 138 to decrease. Alternatively, attenuation and scattering in the optical fibers 150, 152 decrease the optical power in the signals. Modifications to the network 138 to avoid low optical power at the receivers include the insertion of optical amplifiers 160 at various positions in the optical paths. The insertion of optical amplifiers 160 is applied to both optical fibers 150, 152 in a span on a span by span basis, starting with the span having the lowest optical power relative to the respective predetermined optical power. Amplifiers 160 are generally inserted at the farthest possible location from a transmitter that does not result in an unacceptable OSNR.

As mentioned above, an execution of the ALE process determines at each step whether the network 138 still conforms to engineering rules and the user profile constraints evaluated at prior steps. For example, inserting, removing and/or adjusting the settings of components and equipment to address a specific parameter can have adverse effects on other parameters previously examined in the ALE process. If at step 112 the one or more engineering rules or profile constraints are violated, various actions to resolve the problem are performed. In one embodiment, OSNR and crosstalk violations are addressed by changing the locations of the newly placed amplifiers 160. If no suitable amplifier locations are available to resolve an OSNR failure, then regenerators are added to the system.

Figure 6:
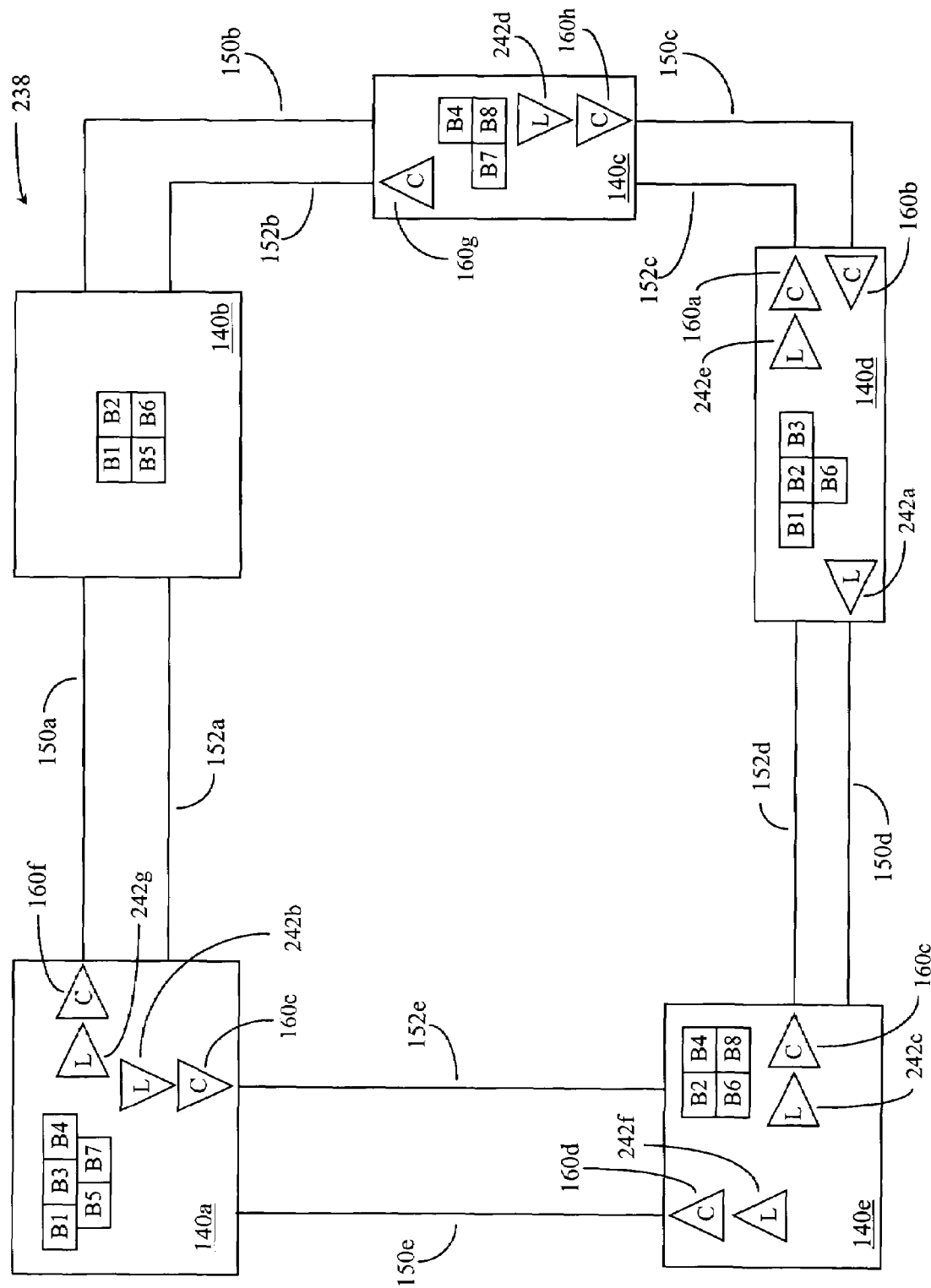
FIG. 6 is a block diagram depicting a modified network generated by applying the automated link engineering process of FIG. 2 to the network of FIG. 3.

FIG. 6 shows a configuration of a modified network 238 that results from applying the ALE process to the initial network configuration 138 of FIG. 3. The configuration resembles a graphical display generated by a software modeling environment. The modifications include the addition of seven L-band amplifiers 242a to 242g (generally 242) with accompanying PBEs and the insertion of regeneration units for L-band B6 at site 140e. The modifications also include the alteration of various component settings described in more detail below with respect to FIG. 7.

Referring to FIG. 2 and FIG. 3, analyzing the links (step 46) indicates that equipment in the initially configured network 138 is receiving inadequate input power. For example for site 140e, analyzing the links indicates that the optical multiplexers in the optical circuit 172 and 186 are underpowered. L-band amplifiers 242a and 242b are included in the modified network configuration 238 to improve the optical power at the optical circuits 172, 186.

Figure 7:
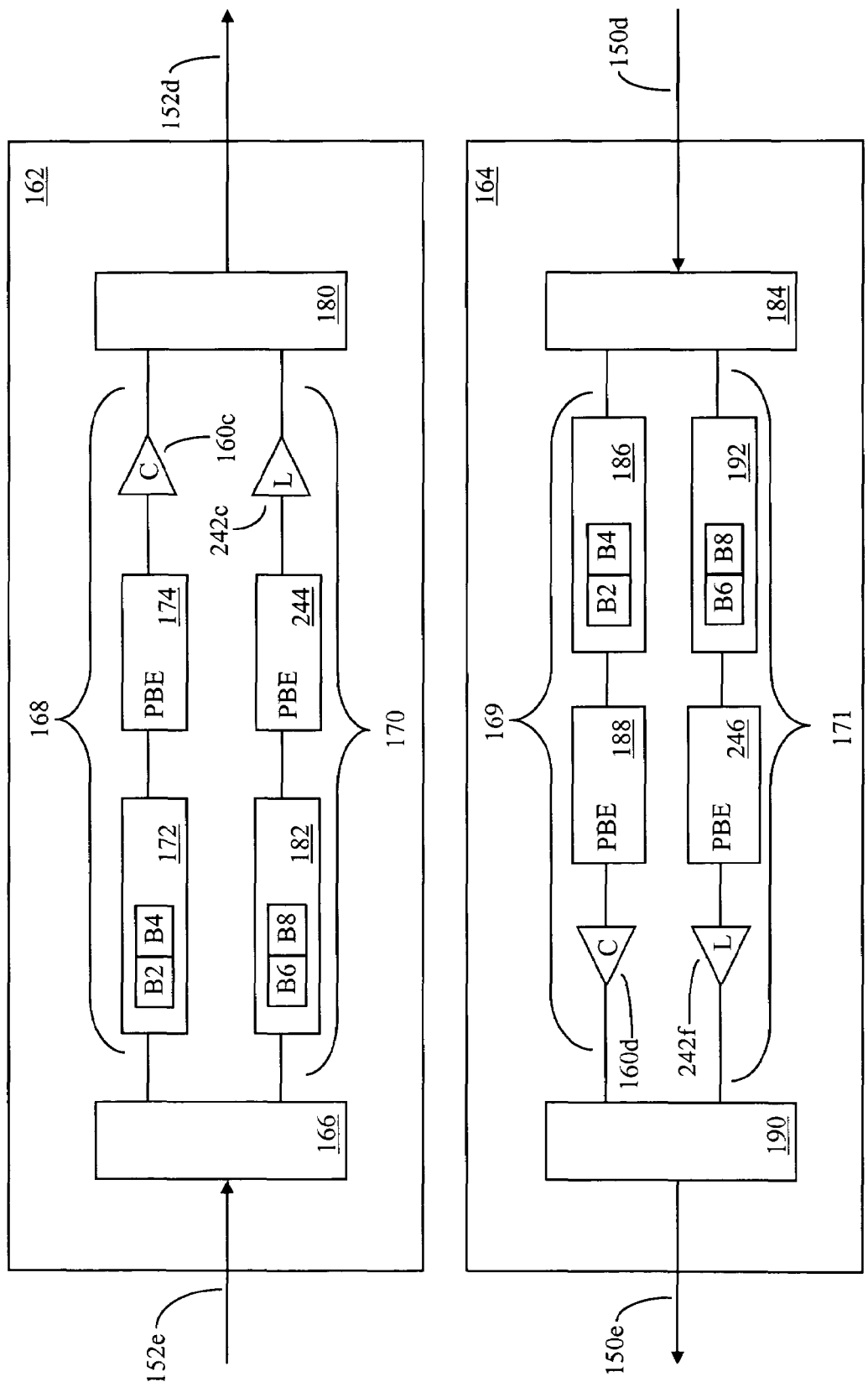
FIG. 7 is a block diagram depicting a portion of the modified network of FIG. 6.

FIG. 7 shows detail of the counter-clockwise 262 and clockwise 264 equipment at the site 140e in the modified network configuration 238. The figure resembles a graphical display generated by a software modeling environment. The components added include two L-band amplifiers 242c and 242f and two PBEs 244 and 246. The optical circuitry 182, 192 in the modified network 248 includes additional optical multiplexers for band B6 with regenerators to address the unacceptable OSNR for the B6 band at the site 140e. The modified network configuration 238 also includes changes to the settings of network components in the initial configuration 138. For example, the C-band PBEs at site 140a and 140e and band drop attenuators of the optical multiplexers at the sites 140 are changed.

While the invention has been shown and described with reference to specific preferred embodiments, it should be understood by those skilled in the art that various changes in form and detail may be made therein without departing from the spirit and scope of the invention as defined by the following claims. For example, the invention contemplates that different steps and alternative orderings of steps can be employed by the ALE process described above.

What is claimed is:

1. A method for generating a configuration of a wavelength division multiplexing network, the method comprising:
   determining values for a plurality of network parameters that represent characteristics of network components and spans in an initial network configuration of the wavelength division multiplexing network;
   evaluating the values of the network parameters according to a plurality of link engineering rules to determine if the network parameters comply with the link engineering rules;
   initiating an automated link engineering process operating so that:
   if the network parameters are not in compliance with the link engineering rules, generating a modified network configuration for the wavelength division multiplexing network having values for the network parameters that comply with the link engineering rules, the modified network configuration allowing for additions, deletions, position changes, and changes in settings to network components; and
   if the network parameters are in compliance with the link engineering rules, terminating the automated link engineering process without modifying the initial configuration, and generating an error report including a list of the link engineering rules for which acceptable performance could not be achieved.

2. The method of claim 1 wherein the network parameters include an optical signal parameter that is a function of the characteristic of one of the spans.

3. The method of claim 1 wherein the link engineering rules comprise a limitation on a number of optical regenerators allowed in the spans.

4. The method of claim 1 wherein the link engineering rules comprise a maximum acceptable value of chromatic dispersion for the spans.

5. The method of claim 1 wherein the link engineering rules comprise a maximum acceptable value of polarization mode dispersion for the spans.

6. The method of claim 1 wherein the link engineering rules comprise a minimum acceptable optical power for a receiver in one of the spans.

7. The method of claim 1 wherein the link engineering rules comprise a minimum optical signal to noise ratio for the spans.

8. The method of claim 1 wherein the link engineering rules comprise a minimum acceptable level of crosstalk for the spans.

9. The method of claim 1 wherein generating a modified network configuration comprises adjusting a placement of an optical regenerator in one of the spans.

10. The method of claim 1 wherein generating a modified network configuration comprises adjusting a placement of an optical amplifier in one of the spans.

11. The method of claim 1 wherein generating a modified network configuration comprises inserting an optical regenerator in one of the spans.

12. The method of claim 1 wherein generating a modified network configuration comprises inserting an optical amplifier in one of the spans.

13. The method of claim 1 wherein generating a modified network configuration comprises adjusting at least one setting of equipment in the wavelength division multiplexing network.

* * * * *